(12) United States Patent
Levine (10) Patent No.: US 9,532,039 B2
(45) Date of Patent: *Dec. 27, 2016

(54) LOCATION BASED MEDIA DISPLAY (71) Applicant: AT&T INTELLECTUAL PROPERTY I, L.P., Atlanta, GA (US)

(72) Inventor: David Alberto Levine, Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 228 days.

This patent is subject to a terminal disclaimer.

(21) Appl. No.: 14/330,637

(22) Filed: Jul. 14, 2014

(65) Prior Publication Data

US 2014/0320616 A1    Oct. 30, 2014

Related U.S. Application Data

(63) Continuation of application No. 12/958,946, filed on Dec. 2, 2010, now Pat. No. 8,817,080.

(51) Int. Cl.
*H04N 13/04* (2006.01)
*H04N 13/00* (2006.01)
*H04N 21/218* (2011.01)
*H04N 21/422* (2011.01)
*H04N 21/45* (2011.01)
(Continued)

(52) U.S. Cl.
CPC .......... *H04N 13/0447* (2013.01); *A63F 13/00* (2013.01); *A63F 13/02* (2013.01); *G06F 3/0325* (2013.01); *H04N 13/0059* (2013.01); *H04N 13/047* (2013.01); *H04N 13/0434* (2013.01); *H04N 13/0436* (2013.01); *H04N 13/0438* (2013.01); *H04N 13/0454* (2013.01); *H04N 13/0468* (2013.01); *H04N 13/0497* (2013.01); *H04N 21/21805* (2013.01); *H04N 21/422* (2013.01); *H04N 21/4524* (2013.01); *A63F 2300/1087* (2013.01); *A63F 2300/308* (2013.01); *A63F 2300/8088* (2013.01); *G09G 2310/0235* (2013.01); *H04N 2213/008* (2013.01)

(58) Field of Classification Search
None
See application file for complete search history.

(56) References Cited

U.S. PATENT DOCUMENTS 5,850,352 A    12/1998   Moezzi et al.
6,188,442 B1   2/2001    Narayanaswami
(Continued)

OTHER PUBLICATIONS

On Tap at Microsoft: A 3D Display Without Glasses and Multiple Programs at Once, The Microsoft Blog, http://blog.seattlepi.com/print.asp?entryID=213713, printed Oct. 22, 2010, 4 pages.

*Primary Examiner* — Sath V Perungavoor
*Assistant Examiner* — Dakshesh Parikh
(74) *Attorney, Agent, or Firm* — Toler Law Group, PC (57) ABSTRACT

A method includes identifying, at a media device, a viewing zone of a plurality of viewing zones associated with a display device. Each viewing zone of the plurality of viewing zones corresponds to a different spatial region of a plurality of spatial regions relative to the display device, where each viewing zone has a corresponding spatial region. The method further includes selecting a video stream based on the viewing zone. The method further includes sending the video stream from the media device to the display device.

20 Claims, 6 Drawing Sheets (51) Int. Cl.
   *A63F 13/00*      (2014.01)
   *A63F 13/98*      (2014.01)
   *G06F 3/03*       (2006.01)

(56) References Cited

U.S. PATENT DOCUMENTS

2008/0158095 A1* 7/2008 Neidrich .................. A63F 13/02
                                                    345/6
2010/0007582 A1* 1/2010 Zalewski ................ A63F 13/00
                                                    345/8

* cited by examiner

LOCATION BASED MEDIA DISPLAY

CLAIM OF PRIORITY

This application is a continuation of and claims priority from U.S. patent application Ser. No. 12/958,946, filed Dec. 2, 2010, and entitled "LOCATION BASED MEDIA DISPLAY," which is hereby incorporated by reference in its entirety.

FIELD OF THE DISCLOSURE

The present disclosure is generally related to location based media display.

BACKGROUND

Certain systems provide three-dimensional (3-D) images to viewers via 3-D television systems. Some of these 3-D television systems utilize special 3-D viewing glasses that are adapted to provide a first image to a left eye and a second image to a right eye. A user viewing the images is provided with a representation of a 3-D view by the distinct images presented to right eye and left eye. As 3-D televisions grow in popularity, more consumers may have access to such 3-D television systems and viewing glasses.

DETAILED DESCRIPTION

The growing popularity of 3-D video systems, including 3-D television, may provide an opportunity for new uses of such 3-D technology. In particular, 3-D technology may allow multiple users to view different images on a display device at the same time. For example, multiple users may watch different programs via a 3-D television through use and timing of 3-D glasses. In another example, users may view the same program but be provided with different perspective of the program through use of 3-D glasses. To illustrate, two viewers watching the same program using specially adapted 3-D glasses, may observe different views of a scene within the program while listening to a common audio of the program to have a unique viewing experience for each user. To further illustrate, programming adapted for such viewing may include one or more scenes captured from different viewing perspectives. The different viewing perspectives of the scene may be broadcast or transmitted substantially simultaneously to users. Users observing the same program at the same television set may be presented with different perspective views of the scene. Accordingly, each user or viewer may have a unique experience and a unique perspective on the particular scene or program. For example, a first user may experience or view the scene from the perspective of a first character in the scene and a second viewer may experience the scene from the perspective of a second character of the scene. In another example, two viewers watching a sporting event may be presented with different camera views of the sporting event. To illustrate, a first viewer may observe a television set with a first camera view, and a second viewer watching the same television set may be presented with a second camera view of the sporting event. Both the first user and the second user may observe a full screen video of the respective views. That is, a screen of the television set is not spatially divided. Rather, screen time of the television may be temporally divided.

In a particular embodiment, a method includes receiving media content of a particular program at a media device. The media content of the particular program is received via a plurality of video streams, where each of the plurality of video streams is associated with a different viewing perspective. The method includes determining locations of one or more viewers of a display device relative to a plurality of viewing zones of the display device. The method also includes selecting a video stream of the particular program to display to each viewer of the one or more viewers based on the location of each viewer. One video stream is selected for each viewer, and different video streams are selected for viewers in different viewing zones. The method further includes sending the selected video streams to the display device from the media device.

In a particular embodiment, a system includes a processor and a memory accessible to the processor. The memory includes instructions that, when executed by the processor, cause the processor to receive media content via a plurality of video streams. A first video stream of the plurality of video streams may be associated with a first viewing perspective. The instructions are further executable to cause the processor to determine whether a viewer is associated with the first viewing perspective and to process the first video stream for display when the viewer is associated with the first viewing perspective. The first video stream is not processed for display when the viewer is not associated with the first viewing perspective. The instructions are further executable to cause the processor to send one or more processed video streams to a display device for display.

In a particular embodiment, a non-transitory computer-readable medium includes instructions that, when executed by a processor, cause the processor to receive media content of a particular program via a plurality of video streams. Each of the plurality of video streams is associated with a different viewing perspective. The instructions are further executable to cause the processor to determine locations of one or more viewers of a display device relative to a plurality of viewing zones of the display device. The instructions are further executable to cause the processor to select a video stream of the particular program to display to each viewer of the one or more viewers based on the location of each viewer. One video stream may be selected for each viewer, and different video streams may be selected for viewers in different viewing zones. The instructions are further executable to cause the processor to process the selected video streams for display and to send the processed video streams to the display device.

Figure 1:
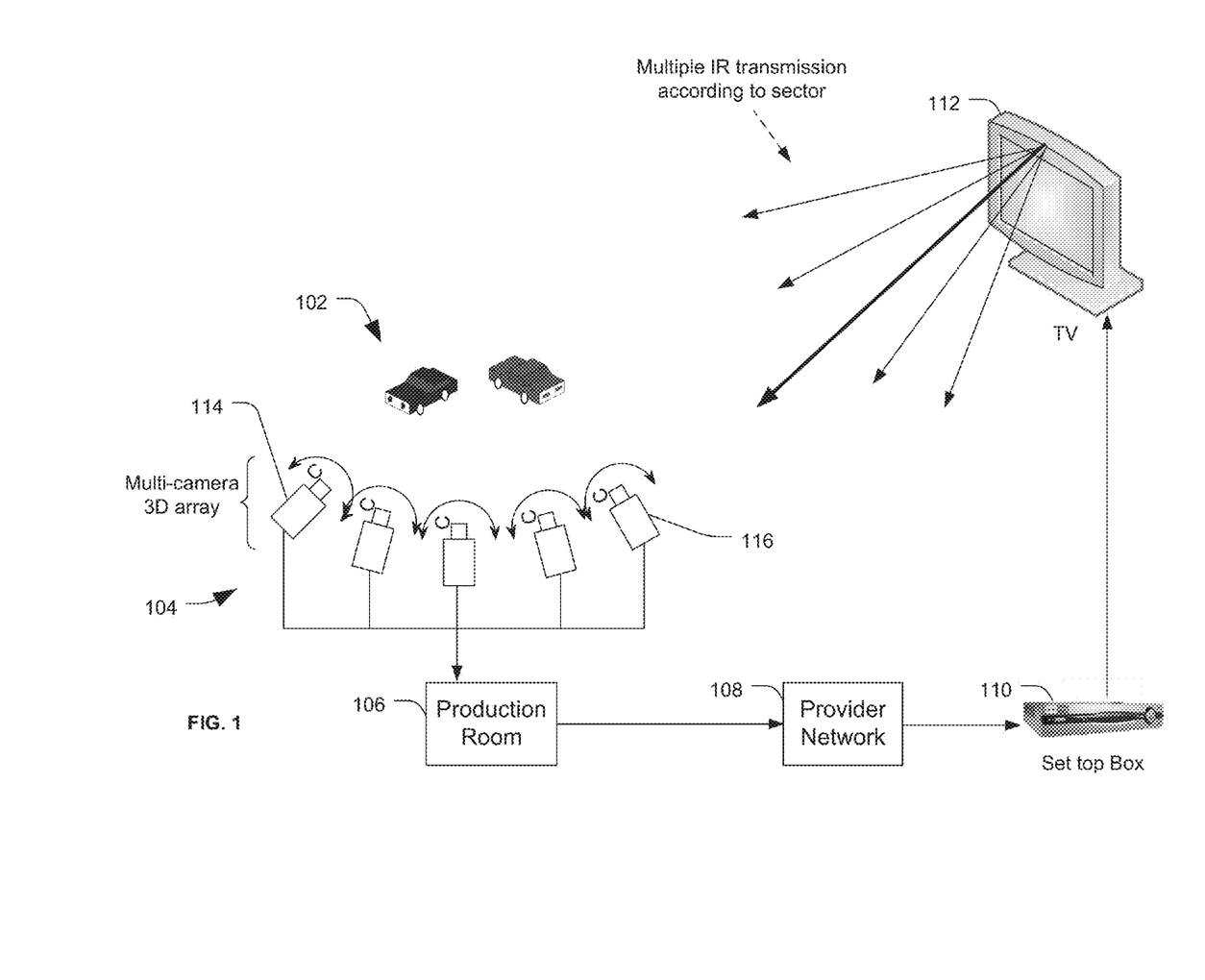
FIG. 1 is a block diagram of a first particular embodiment of a system to display media content based on a location of a viewer.

FIG. 1 is an illustration representing a system adapted to provide multi-angled view television content. The system of FIG. 1 illustrates a scene 102 captured by multiple cameras 104. In particular, the multiple cameras 104 may include a multi-camera three dimensional array arranged to capture multiple perspective views of the scene 102. Images captured by the cameras 104 may be provided to production facility 106. The production facility 106 may use the images captured by the multiple cameras 104 to generate a media content stream including content from two or more of the cameras 104. The content captured by the two or more cameras 104 may be associated with timing information such that the media content captured by the cameras 104 is synchronized. That is, an image captured by a first camera corresponds in time to an image captured by the second camera of the scene 102.

Media content from the production facility 106 may be provided to one or more users via a provider network 108. In particular, the provider network 108 may be associated with one or more set-top boxes 110. For example, the provider network 108 may include a cable television network, an Internet Protocol Television network, a satellite television network, or another provider network. Each of the one or more set-top boxes 110 may be coupled to a television 112. The television 112 may be adapted to provide temporally divided content at a display. In particular, the television 112 may cooperate with viewing glasses, or other systems, that facilitate displaying images on a display screen of the television 112 that are viewable by some viewers and not others.

For example, a view from a first camera 114 may be presented at the television 112 at a first time and a view from a second camera 116 may be presented at the television 112 at a second time. When the view from the first camera 114 is presented at the television 112, a first viewer (not shown) may be able to see the display of the view from the first camera 114. However, a second viewer observing the television 112 may not be able to see the view from the first camera 114 when the view from the first camera 114 is presented at the television 112. The second viewer may be able to see a view from the second camera 116 when the view from the second camera 116 is presented at the television 112. Further, the first viewer who was able to see the view from the first camera 114 may not be able to see the view from the second camera 116 when the view from the second camera 116 is presented at the television 112.

In a particular embodiment, frames of video from the first camera 114 and the second camera 116 are interleaved or time division multiplexed. To illustrate, at a particular time, a frame of video from the first camera 114 may be present at the television 112. When the display of the television 112 is refreshed, the display may be refreshed with a frame of video from the second camera 116. Thus, frames of video from the cameras 114,116 may be alternately presented at the display of the television 112 at a refresh rate of the television 112. In this example, video from each camera 114, 116 is presented at the television 112 at one half the refresh rate of the television 112. More than two views may be interleaved or time division multiplexed in this manner, which will further reduce how frequently frames of video of each view is presented at the display of the television 112. Accordingly, the refresh rate of the television 112 may be high enough to permit a satisfactory user experience while observing video at less than the normal refresh rate of the television 112.

In a particular embodiment, the view that is visible to a particular viewer is determined based on viewing zones associated with the television 112. For example, the television 112 may include an infrared transmission detector that is able to identify when a viewer is in a particular viewing zone associated with the television 112. Thus, viewers observing the television 112 may be provided with different views of a single program based on a location of the viewer relative to the television 112.

In a particular embodiment, each view is associated with a corresponding viewing zone. For example, a first view may be associated with a first viewing zone and a second view may be associated with a second viewing zone. When a viewer that is observing the first view desires to observe the second view, the viewer may relocate to the second viewing zone. For example, the viewer may walk across a room where the television 112 is located to enter the second viewing zone.

In a particular embodiment, the viewers may use a control device that includes a view selector. For example, a remote control device associated with the television 112 may include a directional input selector (such as arrow keys, a joystick, etc.) or another view selector that enables the viewers to select a particular view to associate with a viewing zone. In this embodiment, rather than moving to a viewing zone associated with a desired view, a viewer may select the desired view using the view selector. Views for each viewing zone may be selected independently of one another.

In a particular embodiment, the production facility 106 or the set-top box devices 110 may process video from two or more of the cameras to smooth a transition from a first view to a second view. For example, when a viewer selects a new view for a particular viewing zone, rather than an abrupt change from a previous view to the new view, the set-top box devices 110 may smooth the transition. Thus, the view observed by the viewer may appear to be a continuous view rather than a set of discrete views.

Figure 2:
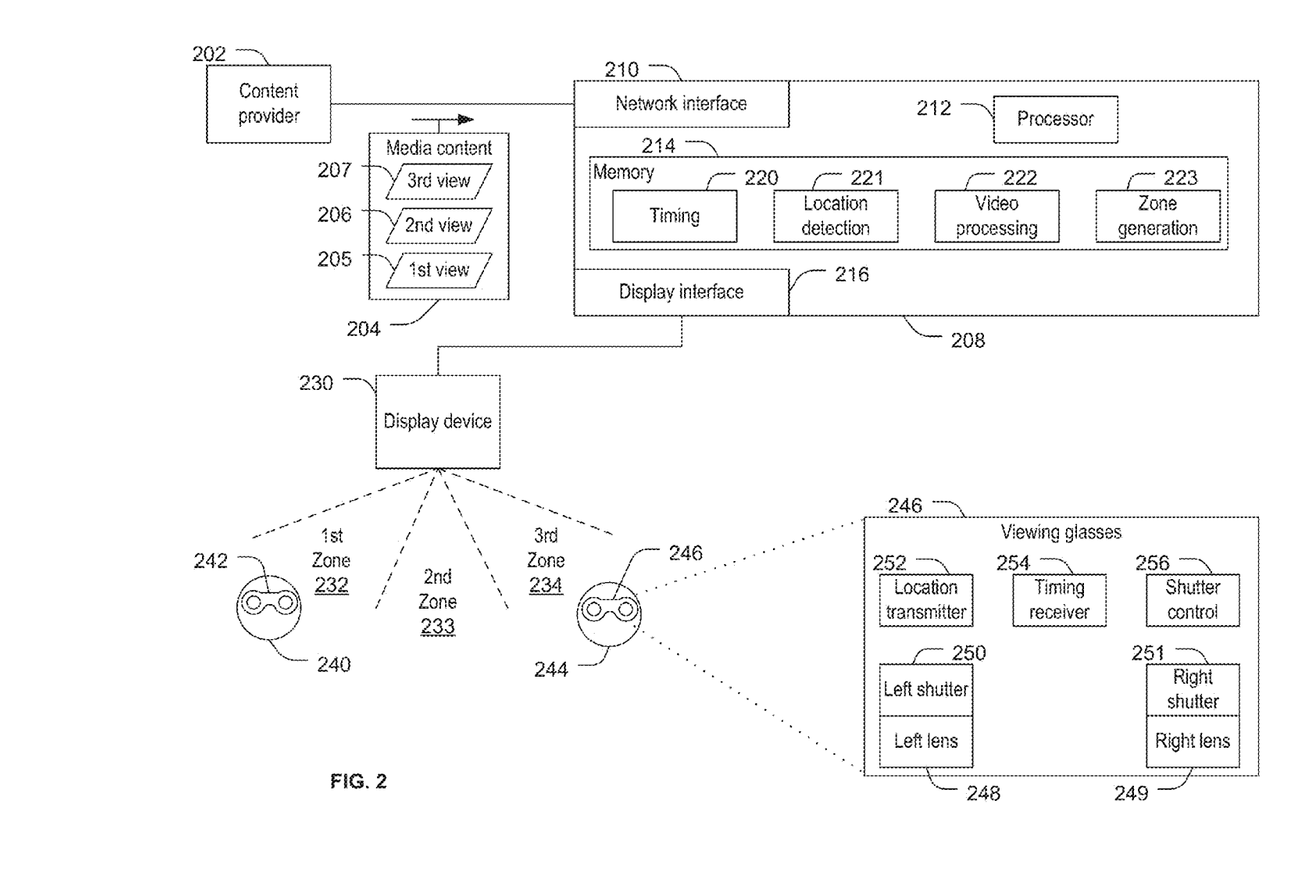
FIG. 2 is a block diagram of a second particular embodiment a system to display media content based on a location of a viewer.

FIG. 2 is a block diagram of a second system for presenting a multi-angle view of television content. In FIG. 2, a content provider 202 provides media content 204 to one or more media devices 208. For example, the content provider 202 may be associated with or include the production facility 106, the provider network 108, or the multi-camera array 104 illustrated in FIG. 1. The media device 208 may include the set-top box 110 or the television 112 of FIG. 1. The media device 208 may provide the media content 204 to a display device 230. The display device 230 may be integral with the media device 208 or may be a separate device, such as a television device coupled to a set-top box device.

One or more viewers 240, 244 may observe the display device 230 to see the media content 204. Each of the viewers 240, 244 may be associated with (e.g., may wear) viewing glasses 242, 246. The media device 208 may cooperate with the viewing glasses 242, 246 to provide each viewer 240, 244 a unique view of the media content 204. For example, the media content 204 may include a plurality of views of a particular program. Each view may correspond to a particular perspective of a portion of the media content. For example, a first view 205 may correspond to a view captured by the first camera 114 of the multi-camera array 104 of FIG. 1. Likewise, a second view 206 may correspond to a view captured by the second camera 116 of the multi-camera array 104 of FIG. 1. Further, a third view 207 may correspond to a view captured by another camera of the multi-camera array 104 of FIG. 1. A first viewer 240 may be provided with the first view 205 but may not be able to see other portions of the media content 204. Similarly, a second viewer 244 may be provided with the third view 207 of the media content 204 but may not be able to see other portions of the media content 204.

In a particular embodiment, the view provided to each of the viewers 240, 244 is associated with the viewing zone of the viewer relative to the display device 230. For example, an area around the display device 230 may be divided into a plurality of viewing zones, such as a first viewing zone 232, a second viewing zone 233, and a third viewing zone 234. The number and location of the viewing zones may be determined based on characteristics of the display device 230 or may be dynamically determined based on characteristics of the media content 204. In the embodiment illustrated in FIG. 2, the first viewer 240 is in the first viewing zone 232. Accordingly, the first viewer 240 may be provided with the first view 205 via the display device 230. Additionally, the second viewer 244 is in the third zone 234. Accordingly, the second viewer 244 may be provided with the third view 207 via the display device 230. The media device 208 may cooperate with the viewing glasses 242, 246 to provide individual views to each or the viewers 240, 244 based on the location of the viewers 240, 244.

In a particular embodiment, the media device 208 includes a network interface 210 to facilitate communication with the content provider 202. The media device 208 may also include a display interface 216 to facilitate communication of the media content 204 to the display device 230. The media device 208 may further include a processor 212 and a memory 214 accessible to the processor 212. The memory 214 may include instructions executable by the processor 212 to perform the various functions of the media device 208. To simplify the discussion of the instructions stored in the memory 214, the instructions are illustrated as divided into various functional blocks 220-223. Each of the functional blocks 220-223 may be associated with particular functions in the following description; however, the media device 208 is not limited to only the functions and described below. Rather, the functional blocks 220-223 are illustrative of particular functions that may be performed by the media device 208. Further, the particular functions may be performed in hardware rather than by instructions executable by the processor 212. For example, the functions may be performed using one or more application specific integrated circuits.

The instructions may include zone generation instructions 223. The zone generation instructions 223 may be adapted to determine a number of views 205-207 that are provided of particular media content 204. The zone generation instructions 223 may also establish the viewing zones 232-234 of the display device 230 based on the number of views of the media content 204. To illustrate, as shown in FIG. 2, the media content 204 includes three views 205-207. The zone generation instructions 232 establish three zones 232-234 corresponding to the three views 205-207. When the media content 204 includes more views or fewer views, the zone generation instructions 232 may establish more zones or fewer zones for the display device 230. To illustrate, the zone generation instructions 232 may change a threshold associated with each zone and a number of zones associated with the display device in order to facilitate identifying a location of each user relative to the viewing zones. For example, the zone generation instructions 232 may assign a first range of viewing angles to correspond to the first zone 232, a second range of viewing angles to correspond to the second zone 233, and a third range of viewing angles to correspond to the third zone 234. The zone generation instructions 232 may divide the area in front of the display device 230 into the viewing zones in a manner that equally divides the viewable area of the viewable angle range of the display device 230 or may divide the viewing area based on information in the media content 204.

The location detection instructions 221 may determine a location of each viewer of the display device 230 relative to the display device 230. In particular, the location detection instructions 221 may determine what viewing zone each user is located in. To illustrate, the location detection instructions 221 may be adapted to process signals received from the viewing glasses 242, 246 to determine the viewing zone 232-234 in which each viewer 240, 244 resides. The signal may be transmitted by the viewing glasses 242, 246 or the viewing glasses 242, 246 may reflect a signal generated by the display device 230. In another example, the signal may be generated by another device (not shown), such as an infrared transmitter or time of flight camera.

The video processing instructions 222 may be executable by the processor 212 to process one or more of the views 205-207 of the media content 204 for display at the display device 230. For example, the video processing instructions 222 may include a video coder/decoder (CODEC) used by the media device 208 to process the media content 204. In a particular embodiment, the location detection instructions 221 determine which of the views 205-207 are processed by the video processing instructions 222. For example, in FIG. 2 a viewer is illustrated as present in the first zone 232 and in the third zone 234; however, no viewer is present in the second zone 233. Accordingly, the first view 205 and the third view 207 may be processed by the video processing instructions 222 in response to determining that a viewer is present in the first zone 232 and the third zone 234. The second view 206 may not be processed by the video processing instructions 222 in response to the location detection instructions 221 determining that no user is present in the second zone 233.

Timing instructions 220 may be used to determine when particular images from the views 205-207 are presented to the display device 230. The timing instructions 220 may also generate a signal that is sent to the viewing glasses 242, 246 and used by the viewing glasses 242, 246 to enable each of the viewers 240, 244 to see an appropriate view.

Exemplary viewing glasses 246 are illustrated in FIG. 2. The exemplary viewing glasses 246 may include a left lens 248 and a right lens 249. Each of the lenses 248, 249 may be associated with a shutter system. For example, the left lens 248 may be associated with a left shutter 250 and the right lens 249 may be associated with a right shutter 251. The shutters 250, 251 may control when the display device 230 is visible through the lens 248, 249. For example, the shutters 250, 251 may obscure a view through the lens 248, 249 responsive to the timing signal sent from the timing instructions 220. The timing signal may be detected by a timing receiver 254 of the viewing glasses 246. The timing signal may be provided to a shutter control system 256 that operates the shutters 250, 251 in accordance with the timing signal. Additionally, the viewing glasses 246 may include a location transmitter 252 that provides location information to the location detection instructions 221.

In operation, the first viewer 240 may be associated with the first glasses 242, and the second viewer 244 may be associated with the second glasses 246. The viewers 240, 244 may tune to the particular media content 204 using the media device 208. The viewers 240, 244 may be present in different viewing zones relative to the display device 230, such as the first viewing zone 232 and the third viewing zone 234 as illustrated in FIG. 2.

The first viewing zone 232 may be associated with the first view 205 and the third viewing zone 234 may be associated with the third view 207 of the media content 204. Accordingly, the location detection instructions 221 may determine the locations of the viewers 240, 244, and may provide location information to the video processing instructions 222. The video processing instructions 222 may process the first view 205 and the third view 207 for display at the display device 230 in response to the location information. The video processing instructions 222 may discard the second view 206. That is, the second view 206 may not be processed for display at the display device 230.

The timing instructions 220 may be used to generate timing information and to generate a timing signal sent to each of the viewing glasses 242, 246. For example, a first timing signal sent to the first glasses 242 may be generated to correspond with timing of presentation images of the first view 205 at the display device 230. Accordingly, the shutters 250, 251 of the first viewing glasses 242 may be timed based on the timing signal to be opened when the images of the first view 205 are presented at the display device 230 and closed when images of the third view 207 are presented via the display device 230. Thus, the first viewer 240 may be able to see the display device 230 through the first viewing glasses 242 when the images corresponding to the first view 205 are displayed at the display device and may not be able to see the display device 230 when images corresponding to the third view 207 are displayed via the display device 230.

In a particular embodiment, the viewing glasses 242-246 are adapted to provide 3-D representations to one or more of the viewers 240-244. In this embodiment, the right shutter 251 and the left shutter 250 may be controlled independently by the shutter controller 256. That is, the right shutter 251 may be open at a different time than the left shutter 250. In this embodiment, the first view 205 may include an image to be presented to the left eye of the viewer and an image to be presented to a right eye of the viewer. Thus, the right shutter 251 may be open when an image corresponding to a right eye image of the first view 205 is presented at the display device 230. However, the right shutter 251 may be closed (obscuring the view) when a left eye image of the first view 205 is presented via the display device 230 and when any image associated with the third view 207 is presented to the display device 230. Additionally, the left shutter 250 may be open when a left eye image of the first view 205 is presented to the display device 230 and may be closed when a right eye view of the first view 205 or any image of the third view 207 is presented via the display device 230. Accordingly, the first viewer 240 may be able to see a 3-D representation of the first view 205 using the viewing glasses 242, and the second viewer 244 may be able to see a three dimensional representation of the third view 207 using the second viewing glasses 246. In a particular embodiment, the first viewer 240 may be presented with 3-D images and the second viewer 244 may be presented with two-dimensional (2-D) images. That is, the first view 205 may include right eye images and left eye images, whereas the third view 206 may include non-3-D data. The images of the third view 207 may be presented simultaneously to the right eye and left eye of the second viewer 244 through the viewing glasses 246.

In a particular embodiment, the location detection instructions 221 may dynamically determine the location of each of the viewers 240, 244. Accordingly, when the first viewer 240 moves to the second zone 233, the location detection instructions 221 may cause the second view 206 to be processed by the video processing instruction 222 and may cause the timing instructions 220 to send a timing signal corresponding to the second view 206 to the first glasses 242. Accordingly, the first viewer 240 may be able to see the second view 206 by moving from the first zone 232 to the second zone 233.

Thus, each viewer 240, 244 of a set of viewers near a single display device 230 may be presented with different views of media content based on a location of each viewer relative to the display device 230. In a particular embodiment, audio associated with media content 204 is provided via the media device 208 or the display device 230. Since the views 205-207 correspond to a single item of media content (such as a television program, sporting event, video-on-demand content, pay-per-view, and so forth), only one audio channel or one audio output is needed.

Figure 3:
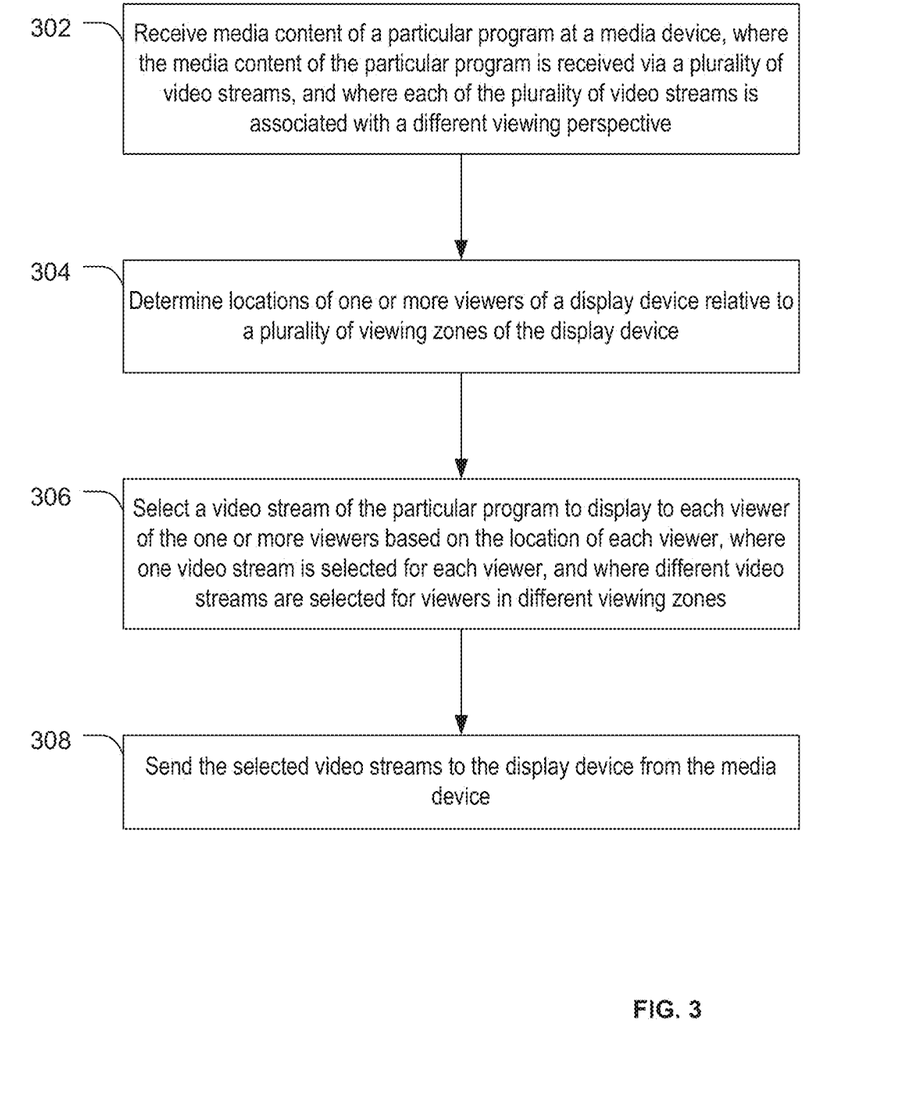
FIG. 3 is a flow chart of a first particular embodiment of a method to display media content based on a location of a viewer.

FIG. 3 is a flow chart of a first particular embodiment of a method of presenting a multi-angled view of content. The method may be performed by a media device, such as the media device 208 of FIG. 2 or the display device 230 of FIG. 2.

The method may include, at 302, receiving media content of a particular program at a media device. The media content of the particular program may be received via a plurality of video streams, such as the multiple views 205-207 of the media content 204 of FIG. 1. Each of the video streams may be associated with a different viewing perspective. To illustrate, the first video stream may be derived from a first camera 114 that has a first viewing angle of the scene 102 of FIG. 1, and a second video stream may be derived from the second camera 116 that has a second viewing angle of the scene 102.

The method may also include, at 304, determining the locations of one or more viewers of a display device relative to a plurality of viewing zones of the display device. For example, the first viewer 240 is located within a first zone 232 in FIG. 2, and the second viewer 244 is located within a third zone 234 of the display device 230. The method may further include, at 306, selecting a video stream of the particular program to display to each viewer of the one or more viewers based on the location of each viewer. One video stream may be selected for each viewer and different video streams may be selected for viewers in different viewing zones of the display device. To illustrate, referring to FIG. 2, the first view 205 may be presented to the first viewer 240 who is within the first zone 232 and the third view 207 may be presented to the second viewer 244 who is in the third zone 234.

The method also includes, at 308, sending the selected video stream to the display device from the media device. Thus, different viewers of a single display device may be able to see different viewing perspectives of the particular program by being presented with different video streams of the particular program.

Figure 4:
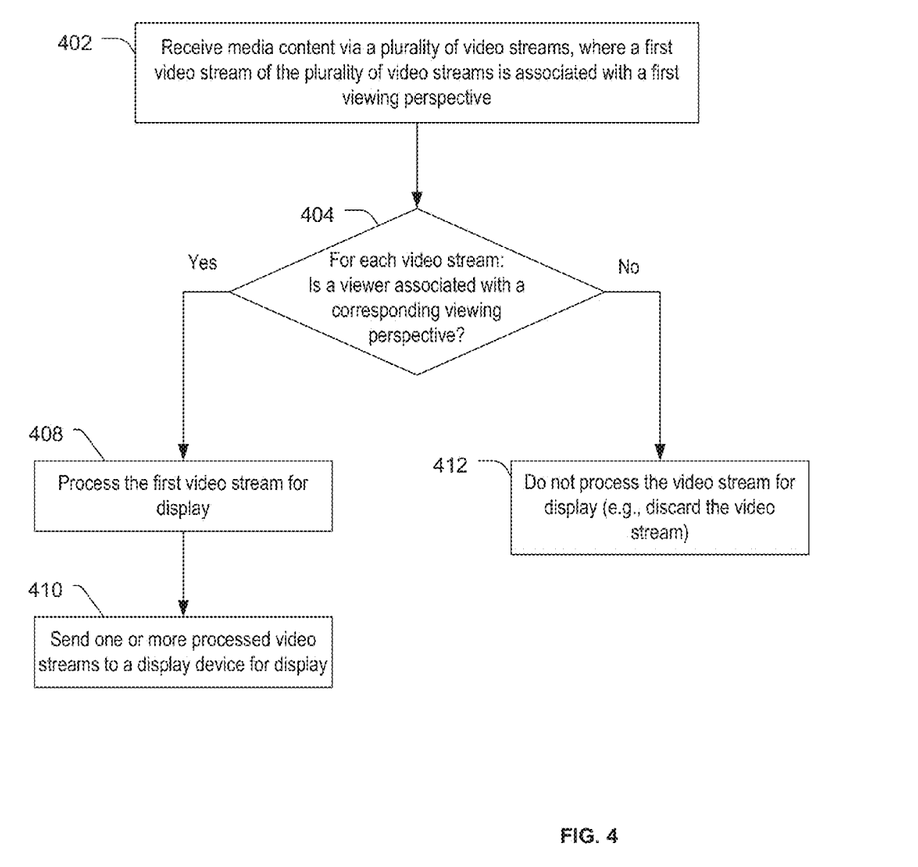
FIG. 4 is a flow chart of a second particular embodiment of a method to display media content based on a location of a viewer.

FIG. 4 illustrates a second particular embodiment of a method to provide multi-angled views of content. The method may be performed at a media device, such as the media device 208 or the display device 230 of FIG. 2. The method includes, at 402, receiving media content via a plurality of video streams. A first video stream of the plurality of video streams may be associated with a first viewing perspective. Similarly, other video streams of the plurality of video streams may be associated with other viewing perspectives. The method may also include, at 404, determining whether a viewer is associated with each of the viewing perspectives. That is, for each video stream, a determination may be made whether a viewer is associated with a corresponding viewing perspective. For example, the determination may be made based on a location of users in viewing zones associated with a display device. When a viewer is associated with a corresponding perspective of a particular video stream, the video stream may be processed for display, at 408. One or more processed video streams may be sent to a device for display, at 410. However, for a particular video stream, when a viewer is not associated with the corresponding perspective view, the particular video stream is not processed for display, at 412. For example, the particular video stream may be discarded by the media device.

Accordingly, the method of providing multi-angle views may reduce total processing demand on the media device by discarding streams that are not relevant to particular users. For example, when a user or viewer is not viewing a particular content stream, the particular content stream may not be processed for display.

Figure 5:
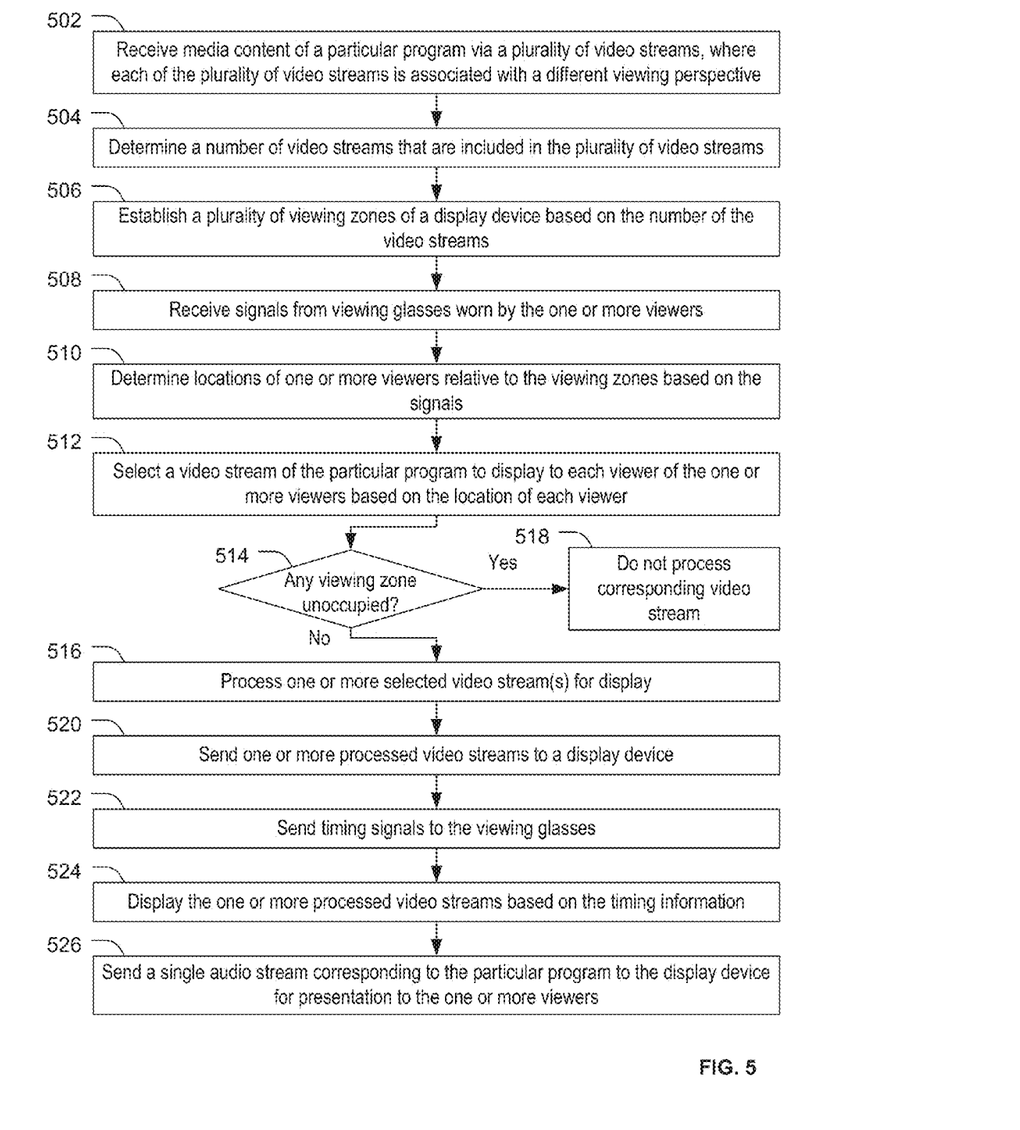
FIG. 5 is a flow chart of a third particular embodiment of a method to display media content based on a location of a viewer.

FIG. 5 is a flow chart of a third particular embodiment of a method of providing multi-angle view of content. The method of FIG. 5 may be performed by a media device, such as the media device 208 or the display device 230 of FIG. 2. The method may include, at 502, receiving media content of a particular program via a plurality of video streams. Each of the plurality of video streams may be associated with a different viewing perspective. For example, referring to FIG. 1, a first video stream may be associated with images captured by the first camera 114, and a second video stream may be associated with images captured by the second video camera 116. The video cameras 114 and 116 may capture different viewing perspectives of the scene 102.

The method may also include, at 504, determining a number of video streams that are included in the plurality of video streams and establishing a plurality of viewing zones of a display device based on the number of viewing streams, at 506. To illustrate, a particular program may be associated with three views. Accordingly, three viewing zones may be established at the display device. However, another particular program may be associated with five views. In this case, five viewing zones may be established at the display device. The viewing zones may be established by assigning a particular range of viewing angles in front of the display device with each zone. For example, where the display device has a 180 degree viewable range, the 180 degree viewable range may be divided in half to provide two viewing zones. Similarly, to provide three viewing zones, the 180-degree range may be divided into three equally spaced 60-degree viewing ranges. However, in certain embodiments, the video streams may be associated with specified viewing angles. For example, for a detective program, it may be desirable to provide a particular video stream that is associated with a relatively narrow range of viewing angles to encourage viewers to take in different perspective views of a scene to detect hidden clues.

The method may include, at 508, receiving signals from viewing glasses worn by one or more viewers. The signals may be generated by the viewing glasses or may be reflected from the viewing glasses. The method may include, at 510, determining a location of the one or more viewers relative to the viewer zones based on the signals.

The method may also include, at 512, selecting a video stream of a particular program to display to each of the viewers based on the location of each viewer. At 514, a determination may be made whether any of the established viewing zones is unoccupied. When a particular viewing zone is unoccupied, at 518, a corresponding video stream may not be processed for display. For example, the corresponding video stream may be discarded. For viewing zones that are occupied, corresponding selected video streams may be processed for display, at 516. The one or more processed video streams may be sent to the display device, at 520.

The method may include, at 522, sending timing signals to the viewing glasses. The timing signals may be used to control the viewing glasses. For example, when a first timing signal is sent to first glasses, a first viewer wearing the first glasses may be able to view a first video stream and may not be able to view a second video stream. Similarly, when a second timing signal is sent to second viewing glasses worn by a second viewer, the second viewer may be able to view the second video stream and may not be able to view the first video stream. To illustrate, the timing signals may be used by the viewing glasses to cause shutters of the viewing glasses to cycle between an open state in which the display device is visible to the viewer and a closed state in which the display device is not visible to the viewer.

The timing signal may be sent to the viewing glasses to specify a rate and timing at which the shutters cycle. The shutters may cycle at a rate that corresponds to a rate at which frames or images of a corresponding video stream are displayed. To illustrate, the first timing signal may be sent to the first viewing glasses associated with the first viewer, and the second timing signal may be sent to the second viewing glasses associated with the second viewer. The first timing signal may be used to cycle the shutters of the first glasses between the open state and the closed state. The first viewer is able to see the display device in the open state and is not able to see the display device in the closed state. The shutters of the first glasses may cycle at a rate that corresponds to a rate at which frames of a first video stream are displayed at the display device. Similarly, the second timing signal may be used to cycle the shutters of the second glasses between the open state and the closed state. The second viewer is able to see the display device in the open state and is not able to see the display device in the closed state. The shutters of the second glasses may cycle at a rate that corresponds to a rate at which frames of a second video stream are displayed at the display device.

In a particular embodiment, the viewing glasses and the media device cooperate to enable a viewer to see a three-dimensional representation via the display device. For example, a left shutter of the first viewing glasses may be closed at least a portion of the time that a right shutter of the first viewing glasses is open. Thus, a left viewing perspective of the first video stream may be presented to a left eye of the first viewer and a right viewing perspective of the first video stream may be presented to a right eye of the viewer to simulate a three dimensional image of the first video stream. The method may include, at 524, displaying the one or more processed video streams based on the timing information. The method may also include, at 526, sending a single audio stream corresponding to the particular program to the display device for presentation to the one or more viewers.

In a particular embodiment, each of the viewers is presented with a full screen display at the display device. That is, the selected video streams are processed and presented at the display device in full screen view. The display may be temporally divided using the timing information, such that the full screen view particular video content is visible to viewers at the particular times. Additionally, when a viewer moves from a first viewing zone to a second viewing zone, the viewer's movement may be detected based on signals from viewing glasses associated with the viewer. For example, first viewing glasses associated with the first viewer may be detected when they move from a first viewing zone to a second viewing zone. In response to detecting the movement, a different timing signal may be sent to the viewing glasses that moved. For example, a second timing signal may be sent to the first viewing glasses in response to detecting that the first viewing glasses have moved from a first viewing zone to a second viewing zone.

As a particular example, the program displayed may include a sporting event, and different cameras may be used to capture different viewing perspectives of the sporting event. A different viewing perspective may be provided as video streams of media content. Thus, by moving from a first viewing zone to a second viewing zone, a viewer may be able to view a different perspective view of a single program, such as the sporting event.

Figure 6:
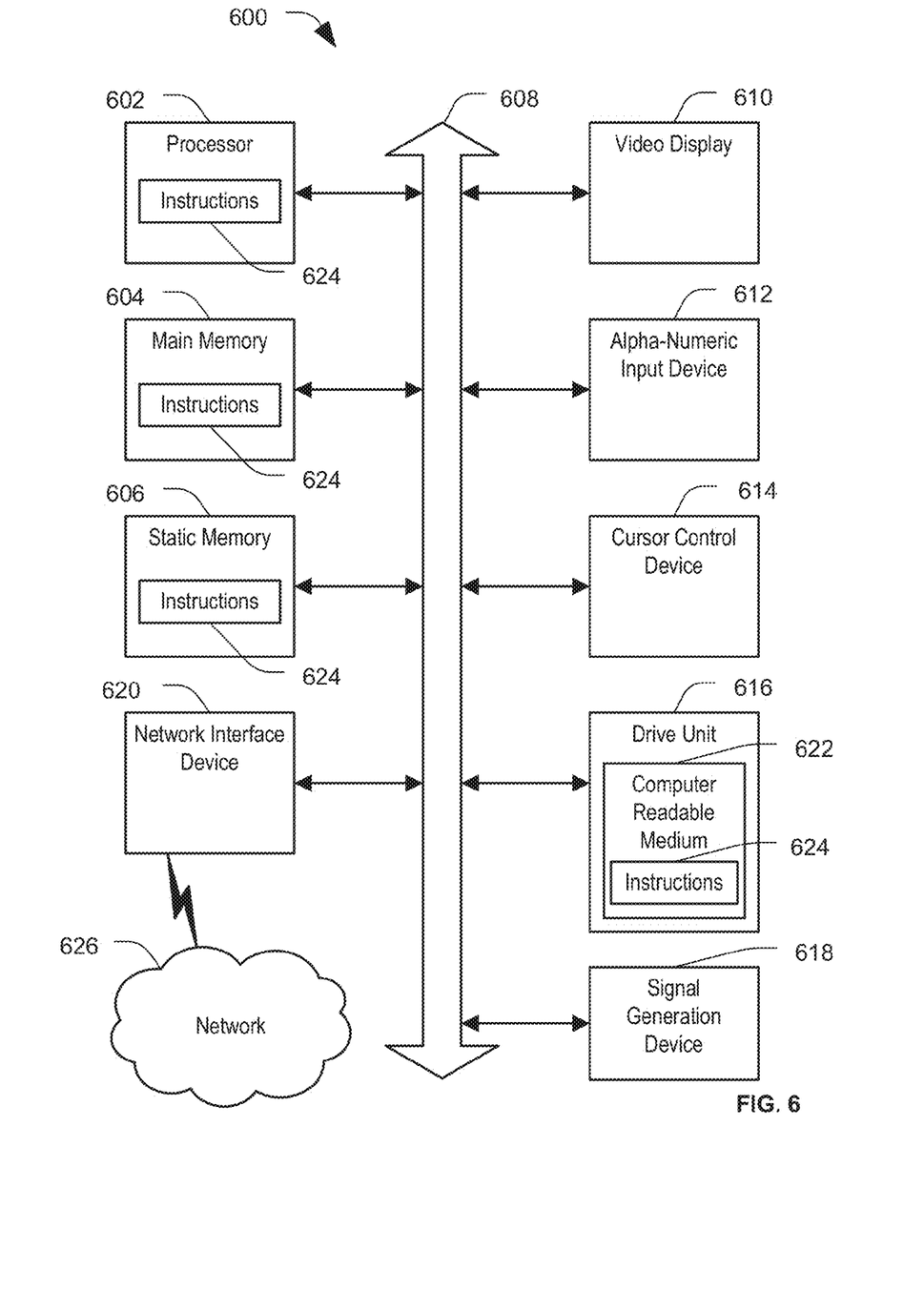
FIG. 6 is a block diagram of an illustrative embodiment of a general computer system.

Referring to FIG. 6, an illustrative embodiment of a general computer system is shown and is designated 600. The computer system 600 includes a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices. For example, the computer system 600 may include or may be included within a device associated with the multi-camera 3-D array 104, the production facility 106, the provider network 108, the set top box 110 or the television 112 of FIG. 1. In another example, the computer system 600 may include or may be included within any one or more of the media device 208, the display device 230 and the viewing glasses 243, 246 of FIG. 2.

The computer system 600 can also be implemented as or incorporated into various other devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include or be coupled to the video display unit 610, such as a liquid crystal display (LCD), an organic light emitting diode (OLED), a flat panel display, a cathode ray tube (CRT) display, a solid-state display, or a projection display. Additionally, the computer system 600 may include an input device 612, such as a keyboard, a remote control device, and a cursor control device 614, such as a mouse. The computer system 600 can also include a disk drive unit 616, a signal generation device 618, such as remote control device, and a network interface device 620. The network interface device 620 may be coupled to other devices (such as, devices associated with the provider network 108 of FIG. 1 or devices associated with the content provider 202 of FIG. 2) via a network 626.

In a particular embodiment, as depicted in FIG. 6, the disk drive unit 616 may include a non-transitory computer-readable medium 622 in which one or more sets of instructions 624, e.g., software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include non-transitory computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by the computer system 600. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a non-transitory computer-readable medium that includes instructions 624 or receives and executes instructions 624, so that a device connected to a network 626 can communicate voice, video or data over the network 626. Further, the instructions 624 may be transmitted or received over the network 626 via the network interface device 620.

The term "computer-readable medium" may include a single medium or multiple media, such as a centralized or distributed database, and/or associated caches and servers that store one or more sets of instructions. The term "computer-readable medium" may refer to any non-transitory medium that is capable of storing, or encoding a set of instructions 624 for execution by the processor 602 or that cause the computer system 600 to perform any one or more of the methods or operations disclosed herein.

In a particular non-limiting, exemplary embodiment, the computer-readable medium can include a solid-state memory, such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable storage medium and other equivalents and successor media, in which data or instructions may be stored.

Software (e.g., the instructions 624) that implement the disclosed methods may be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g., TCP/IP, UDP/IP, HTML, HTTP, and Internet Group Management Protocol (IGMP)) and standards for encoding or viewing media content (e.g., MPEG, SMPTE, SVC and H.264) represent examples of the state of the art. Such standards may occasionally be superseded by faster or more efficient equivalents having substantially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
identifying, at a media device, a viewing zone of a plurality of viewing zones associated with a display device, wherein each viewing zone of the plurality of viewing zones corresponds to a different spatial region of a plurality of spatial regions relative to the display device;
selecting a video stream based on the viewing zone; and
sending the video stream from the media device to the display device.

2. The method of claim 1, wherein the video stream is associated with a program.

3. The method of claim 2, wherein the video stream is one of a plurality of video streams and each video stream is associated with a different viewing perspective associated with the program.

4. The method of claim 1, wherein the media device is a set-top box or a television.

5. The method of claim 1, further comprising receiving a plurality of video streams from a content provider.

6. The method of claim 1, wherein each spatial region of the plurality of spatial regions is a region of space located in front of the display.

7. The method of claim 1, wherein each viewing zone corresponds to a different video stream of a plurality of video streams.

8. The method of claim 7, further comprising sending a single audio stream associated with the plurality of video streams to a speaker.

9. The method of claim 7, further comprising determining a number of zones of the plurality of viewing zones based on a number of streams of the plurality of video streams.

10. The method of claim 1, further comprising sending a timing signal associated with the video stream to a viewing device.

11. The method of claim 1, wherein the viewing device includes a pair of glasses.

12. A system comprising:
a processor; and
a memory accessible to the processor, the memory comprising instructions that, when executed by the processor, cause the processor to execute operations, the operations comprising:
determining, based on a location of a viewing device, a viewing zone of a plurality of viewing zones associated with a display, wherein each viewing zone of the plurality of viewing zones corresponds to a different spatial region of a plurality of spatial regions relative to the display;
selecting timing information based on the viewing zone; and
sending the timing information to the viewing device.

13. The system of claim 12, wherein the viewing device includes a pair of glasses.

14. The system of claim 13, wherein the pair of glasses is configurable to simulate a three-dimensional image of a video stream.

15. The system of claim 12, wherein the timing information is associated with a rate at which frames of a video stream are displayed.

16. The system of claim 15, wherein the timing information enables the video stream presented via the display to be viewed using the viewing device and prohibits other video streams presented via the display from being viewed using the viewing device.

17. The system of claim 12, further comprising:
a receiver configured to receive a location signal transmitted by the viewing device, wherein the location signal is associated with a physical location of the viewing device, and
wherein the operations further comprise:
receiving the location signal at the receiver; and
determining the location of the viewing device based on the location signal.

18. A computer-readable storage device comprising instructions executable by a processor to perform operations comprising:
identifying a viewing zone of a plurality of viewing zones associated with a display, wherein each viewing zone of the plurality of viewing zones corresponds to a different spatial region of a plurality of spatial regions relative to the display;
selecting timing signals based on the viewing zone; and
sending the timing signals to a viewing device.

19. The computer-readable storage device of claim 18, wherein the timing signals enable viewing of a video stream via the viewing device, and wherein the viewing device includes a pair of viewing glasses.

20. The computer-readable storage device of claim 18, wherein the operations further comprise sending a video stream of a plurality of video streams to the display.

\* \* \* \* \*